(12) United States Patent
Uehara et al.

(10) Patent No.: US 7,440,688 B2
(45) Date of Patent: Oct. 21, 2008

(54) IMAGE BLUR COMPENSATION APPARATUS

(75) Inventors: Takumi Uehara, Suginami-ku (JP);
Koichi Washisu, Suginami-ku (JP)

(73) Assignee: Canon Kabushiki Kaisha, Tokyo (JP)

(*) Notice: Subject to any disclaimer, the term of this patent is extended or adjusted under 35 U.S.C. 154(b) by 339 days.

(21) Appl. No.: 11/340,355

(22) Filed: Jan. 25, 2006

(65) Prior Publication Data
US 2006/0165397 A1    Jul. 27, 2006

(30) Foreign Application Priority Data
Jan. 25, 2005   (JP) .............................. 2005-016267

(51) Int. Cl.
*G03B 17/00*   (2006.01)
(52) U.S. Cl. .................................... 396/55; 359/554
(58) Field of Classification Search .................. 396/53, 396/52, 55; 348/208.1; 359/554
See application file for complete search history.

(56) References Cited

U.S. PATENT DOCUMENTS 5,619,293 A * 4/1997 Usui ........................... 396/55

6,286,327 B1   9/2001 Karl

FOREIGN PATENT DOCUMENTS

| JP | 5-257088 | 10/1993 |
|----|----------|---------|
| JP | 10-174470 | 6/1998 |
| JP | 10-181343 | 7/1998 |

* cited by examiner

*Primary Examiner*—Melissa Jan Koval
*Assistant Examiner*—Autumn Parker
(74) *Attorney, Agent, or Firm*—Morgan & Finnegan, LLP

(57) ABSTRACT

An image blur compensation apparatus includes first and second driving units (17a, 17b, 16a, 16b) having functionally equivalent members each other. A resultant force which acts on a holding unit (12) when in-phase driving signals of the same amount are applied to the first and second driving units differs in magnitude from a resultant force which acts on the holding unit when reverse-phase driving signals of the same amount are applied to the first and second driving units. The first and second driving units are arranged such that these resultant forces become perpendicular to each other.

9 Claims, 13 Drawing Sheets

PRIOR ART

PRIOR ART

FIG. 15B
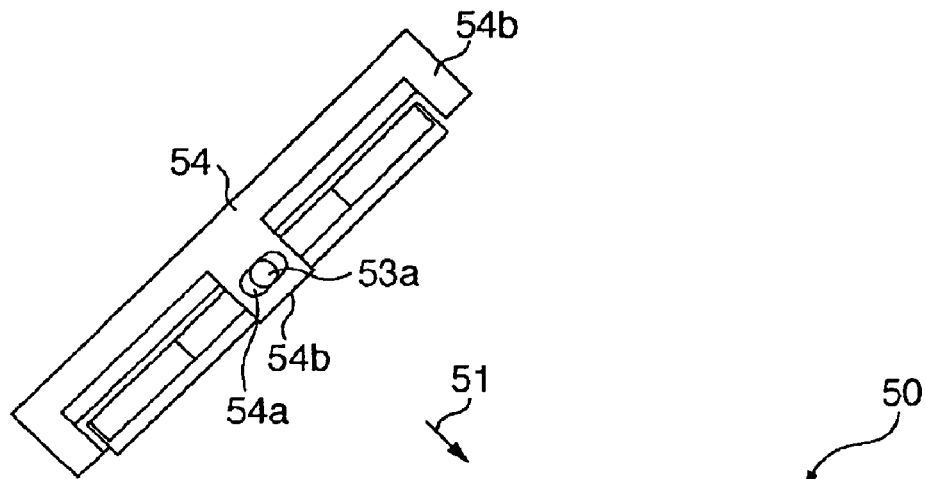
PRIOR ART
FIG. 15C
PRIOR ART
FIG. 15A
PRIOR ART
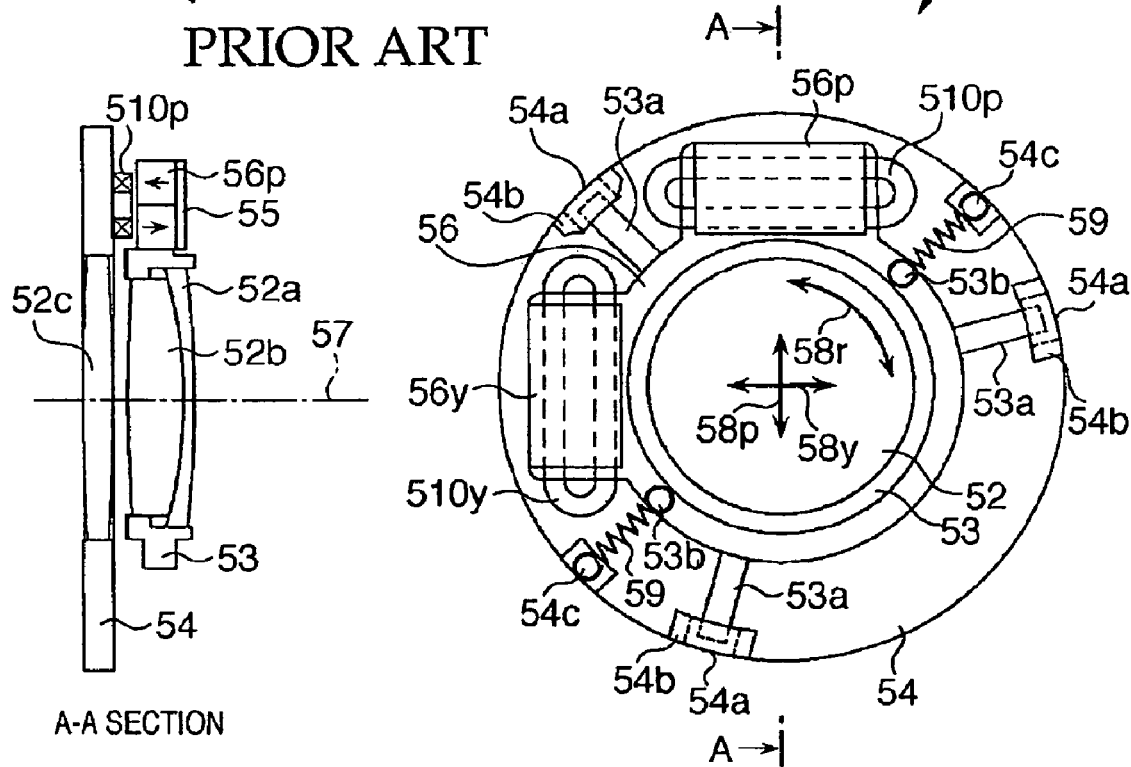

IMAGE BLUR COMPENSATION APPARATUS

FIELD OF THE INVENTION

The present invention relates to an image blur compensation apparatus which compensates for image blur caused by e.g. camera shake in an optical apparatus such as a camera, and an optical apparatus including the image blur compensation apparatus.

BACKGROUND OF THE INVENTION

Current cameras are capable of automatically performing important operations for photography such as exposure determination and focusing, and hence it is highly unlikely even for a person who is unskilled in camera operation to commit a photography failure. Recently, advances have been made in an image blur compensation apparatuses which compensate for image blur caused by e.g. camera shake applied to cameras. There are, therefore, hardly any factors that induce photography mistakes by photographers.

An image blur compensation apparatus will be briefly described below. Vibration (camera shake) caused by hand movement during photography is generally vibration of about 1 Hz to 10 Hz. A basic method which can photograph pictures without any image blur even at the occurrence of such camera shake at the time of shutter release is to detect the above camera shake caused by hand movement and move the compensation lens of the camera in accordance with the detection value. Therefore, in order to photograph a picture without any image blur even at the occurrence of camera shake, the first requirement is to accurately detect camera shake, and the second requirement is to compensate for a change in optical axis due to the camera shake.

In principle, camera shake detection can be performed by equipping a camera with a means for detecting an acceleration, angular acceleration, angular velocity, angular displacement, or the like and arithmetically processing the resultant output for camera shake compensation as needed. An image blur compensation apparatus which shifts the photographing optical axis is driven on the basis of the arithmetic processing result, thereby suppressing image blur (compensating for image blur).

FIG. 12 is a perspective view showing an example of a digital compact camera. A camera body 43 comprises a release button 43a, a mode dial (including a main switch) 43b, a retractable electronic flash 43c, and an apparatus (not shown) which prevents the above image blur. Although not seen from the angle of the camera body 43 shown in FIG. 12, a liquid crystal monitor is provided on the back surface of the camera body 43. The liquid crystal monitor functions as an electronic viewfinder. The user can perform photography while checking, on the liquid crystal monitor, an image to be sensed by an image sensing device (to be described later). Activating the above image blur compensation apparatus in this photographing operation makes it possible to compensate for image blur in the camera vertical direction (pitch direction) 42p relative to an optical axis 41 and image blur in the horizontal direction (yaw direction) 42y.

FIG. 13 is a perspective view showing the arrangement of the main part of the image blur compensation apparatus mounted in the camera body 43 in FIG. 12. Referring to FIG. 13, reference numeral 52 denotes a compensation lens which is an optical system for compensating for image blur; and 53, a holding frame which holds the compensation lens 52. Reference numeral 50 denotes an image blur compensation apparatus which comprises the compensation lens 52, the holding frame 53, and the like and compensates for image blur in the pitch direction 42p and image blur in the yaw direction 42y shown in FIG. 12 by being freely driven in the directions indicated by arrows 58p and 58y. This apparatus will be described in detail later. Reference numerals 45p and 45y denote camera shake detection units, respectively, which comprise angular velocity meters, angular acceleration meters, or the like which detect camera shake around arrows 46p and 46y. Reference numeral 44 denotes an image sensing device. Outputs from the camera shake detection units 45p and 45y are transformed into driving target values for the image blur compensation apparatus 50 through arithmetic circuits 47p and 47y (to be described later). When the driving target values are input to the coils of the image blur compensation apparatus 50, image blur compensation is performed.

FIG. 14 is a block diagram showing the camera shake detection unit 45p and the arithmetic circuit 47p shown in FIG. 13. Since the arithmetic circuit 47y has the same arrangement as that of the arithmetic circuit 47p, only the arithmetic circuit 47p will be described in detail below.

In the following description, the term "image blur compensation apparatus" sometimes indicates an overall mechanism for image blur compensation, including the camera shake detection units 45p and 45y, the arithmetic circuits 47p and 47y, and the like in addition to the image blur compensation apparatus 50.

The arithmetic circuit 47p includes a DC cut filter/amplifier 48p, a low-pass filter/amplifier 49p, and an A/D conversion unit 410p which converts an analog signal into a digital signal, as indicated by the area enclosed by the chain line. The arithmetic circuit 47p further includes a camera microcomputer 411 and a known driving circuit unit 420p comprising a PWM (Pulse Width Modulation) driver and the like. The camera microcomputer 411 includes a storage unit 412p, differential amplifier 413p, DC cut filter 414p, integrating unit 415p, responsiveness adjusting unit 416p, storage unit 417p, differential amplifier 418p, and PWM duty transform unit 419p. Note that a DC means a direct current.

In this case, the camera shake detection unit 45p includes a camera shake gyro sensor which detects the camera shake angular velocity. The camera shake gyro sensor is driven in synchronism with ON operation of the main switch of the camera to start detecting a camera shake angular velocity applied to the camera. The DC cut filter/amplifier 48p comprising an analog circuit in the arithmetic circuit 47p cuts off a DC bias component superimposed on an output signal from the camera shake detection unit 45p, and amplifies the signal as needed. The DC cut filter/amplifier 48p has a frequency response that cuts off signals with frequencies of 0.1 Hz or less so as to avoid influences on a camera shake frequency range of 1 Hz to 10 Hz applied to the camera. If, however, the DC cut filter/amplifier 48p is designed to have a frequency response that cuts off signals of frequencies of 0.1 Hz or less, it takes about 10 sec to completely cut off DC bias components after a image blur signal is input from the camera shake detection unit 45p. For this reason, the time constant of the DC cut filter/amplifier 48p is set to be small (for example, is set to a response frequency that cuts off signals of frequencies of 10 Hz or less) until, for example, 0.1 sec after the main switch of the camera is turned on, thereby cutting off DC bias components for a short period of time, e.g., about 0.1 sec. Thereafter, the time constant is increased (to have a frequency response that cuts off only signals of frequencies of 0.1 Hz or less) to prevent a camera shake angular velocity signal from deteriorating due to the DC cut filter/amplifier 48p.

An output from the DC cut filter/amplifier 48p is amplified by the low-pass filter/amplifier 49p comprising an analog circuit in accordance with the A/D resolution of the A/D conversion unit 410p, as needed. In addition, high-frequency noise superimposed on the output (i.e., the camera shake angular velocity signal) is cut off. This operation is performed to prevent a read error of a camera shake angular velocity signal due to noise in the camera shake angular velocity signal in sampling operation performed by the A/D conversion unit 410p when the camera shake angular velocity signal is input to the camera microcomputer 411. The signal output from the low-pass filter/amplifier 49p is sampled by the A/D conversion unit 410p on the next stage and is input to the camera microcomputer 411.

Signal processing in the camera microcomputer 411 will be described below. The DC bias components of a camera shake angular velocity signal are cut off by the DC cut filter/amplifier 48p described above. Thereafter, however, DC bias components are superimposed on a camera shake angular velocity signal due to amplification by the low-pass filter/amplifier 49p, and hence it is necessary to perform DC bias component cutting (to be also referred to as "DC cutting" hereinafter) in the camera microcomputer 411. Therefore, for example, a camera shake angular velocity signal sampled 0.2 sec after the camera main switch is turned on is stored in the storage unit 412p, and the differential amplifier 413p obtains the difference between the stored value and the camera shake angular velocity signal, thereby performing DC cutting. Note that in this operation, since DC bias components can only be roughly cut off, the DC cut filter 414p comprising a digital filter on the subsequent stage further performs sufficient DC cutting. The reason why the differential amplifier 413p can only roughly perform DC cutting is that a camera shake angular velocity signal stored 0.2 sec after the camera main switch is turned on contains not only DC components but also actual camera shake. The time constant of the DC cut filter 414p can also be changed like the analog DC cut filter/amplifier 48p. The time constant of the DC cut filter 414p is gradually increased 0.2 sec after a lapse of 0.2 sec since turning-on of the main switch of the camera. More specifically, the DC cut filter 414p has a filter characteristic that cuts off frequencies of 10 Hz or less after a lapse of 0.2 sec since turning-on of the main switch. Subsequently, the cutoff frequency of the filter is decreased every 50 msec like 5 Hz>1 Hz>0.5 Hz>0.2 Hz. When the photographer half-presses the shutter release button (turns on sw1) during the above operation to start photometry and distance measurement, photography can be immediately performed, and it may not be desirable to consume much time to change the time constant.

In such a case, the operation of changing the time constant is stopped halfway in accordance with a photographing condition. If, for example, it is determined from a photometry result that the photographing shutter speed is 1/60, and the photographing focal length is 150 mm, the image blur compensation accuracy need not be very high. The DC cut filter 414p therefore finishes changing the time constant when the time constant is changed up to a characteristic that cuts off frequencies of 0.5 Hz or less (controls the time constant change amount in accordance with the product of a shutter speed and a photographing focal length). This makes it possible to shorten the time required to change the time constant, thereby giving priority to a shutter release opportunity. Assume that the shutter speed is higher or the focal length is shorter. Obviously, in this case, when the time constant is changed up to a characteristic that cuts off frequencies of 1 Hz or less, the DC cut filter 414p finishes the changing operation. Alternatively, if the shutter speed is lower and the focal length is longer, photography is inhibited until the time constant is completely changed.

The integrating unit 415p integrates signals from the DC cut filter 414p to transform the angular velocity signal into an angular signal. The responsiveness adjusting unit 416p on the next stage amplifies the integrated angular signal, as needed, on the basis of the focal length of the camera and object distance information at that point of time, and transforms the angular signal such that the image blur compensation apparatus can be driven by a proper amount in accordance with the image blur angle. This transformation needs to be performed because the photographing optical system changes upon zooming and focusing operations and the optical axis shift amount changes with respect to the driving amount of the compensation lens 52.

When the shutter release button is half-pressed (sw1 is turned on), an operation of the image blur compensation apparatus 50 starts. At this point of time, care should be taken to prevent the image blur compensation apparatus 50 from abruptly starting image blur compensating operation. The storage unit 417p and the differential amplifier 418p are provided for this purpose. The storage unit 417p stores the camera shake angular signal from the integrating unit 415p which is obtained when the above shutter release button is half-pressed. The differential amplifier 418p obtains the difference between the signal from the integrating unit 415p and the signal from the storage unit 417p. When the shutter release button is half-pressed, the two signal inputs to the differential amplifier 418p are equal to each other, and a driving target value signal from the differential amplifier 418p to the image blur compensation apparatus 50 is zero. Thereafter, a predetermined value is continuously output as a driving target value signal (i.e., the storage unit 417p serves to set the integration signal as the origin when the shutter release button is half-pressed). This prevents the image blur compensation apparatus 50 from abruptly starting to be driven.

The target value signal from the differential amplifier 418p is input to the PWM duty transform unit 419p. When a voltage or current corresponding to the camera shake angle is applied to the coil provided in the image blur compensation apparatus 50, the image blur compensation apparatus 50 (the compensation lens 52 and the holding frame 53) is driven in accordance with the camera shake angle. The image blur compensation apparatus 50 is preferably driven by PWM to save the driving power consumption of the compensation lens 52 and the power consumption of a drive transistor for the coils. For this reason, the PWM duty transform unit 419p changes the duty for coil driving in accordance with the target signal value. For example, in the case of PWM using a frequency of 20 kHz, the duty is set to "0" when the target signal value from the differential amplifier 418p is "2,048", and to "100" when the target signal value is "4,096". Then, the range between these duties is divided into equal parts so that the duty is determined in accordance with the target signal value. Note that the duty determination may be precisely controlled based not only on the target signal value but also on the current photographing conditions for the camera (including the temperature, the posture of the camera, and the state of the battery), so as to realize accurate image blur compensation.

An output from the PWM duty transform unit 419p is input to the known driving circuit unit 420p comprising a PWM driver and the like, and an output from the driving circuit unit 420p is applied to the coil provided in the image blur compensation apparatus 50, thereby performing image blur compensation. The driving circuit unit 420p is activated in synchronism with the timing at which 0.2 sec elapses after the shutter release button is half-pressed.

Although not shown in the block diagram of FIG. 14, even when the photographer fully presses the shutter release button of the camera (turns on sw2) to start exposure, since image blur compensation is kept performed, a deterioration in image quality due to blur of photographed image can be prevented. In addition, the image blur compensation apparatus 50 keeps performing image blur compensation as long as the shutter release button is half-pressed (sw1 is turned on). When the half-pressed button is released, the storage unit 417p stops storing a signal from the responsiveness adjusting unit 416p (transits into a sampling state). As a result, the signals input from the responsiveness adjusting unit 416p and the storage unit 417p to the differential amplifier 418p become equal to each other, and an output from the differential amplifier 418p becomes zero. Consequently, a zero driving target value is input to the image blur compensation apparatus 50, thus stopping image blur compensation.

The integrating unit 415p keeps performing integration unless the main switch of the camera is turned off. When the shutter release button is then half-pressed (sw1 is turned on), the storage unit 417p stores a new integration output (holds a signal). When the main switch is turned off, the camera shake detection unit 45p is turned off, thus terminating a series of image blur compensating operations.

If a signal from the integrating unit 415p becomes larger than a predetermined value, the DC cut filter 414p determines that panning of the camera has been performed, and changes the time constant of the DC cut filter 414p. For example, the DC cut filter 414p changes, for example, a characteristic that cuts off frequencies of 0.2 Hz or less to a characteristic that cuts off frequencies of 1 Hz or less, and then returns the time constant to the initial value in a predetermined period of time. This time constant change amount is also controlled by the magnitude of an output from the integrating unit 415p. More specifically, if the output exceeds the first threshold, the characteristic of the DC cut filter 414p is changed to a characteristic that cuts off frequencies of 0.5 Hz or less. If the output exceeds the second threshold, the characteristic is changed to a characteristic that cuts off frequencies of 1 Hz or less. If the output exceeds the third threshold, the characteristic is changed to a characteristic that cuts off frequencies of 5 Hz or less. When an output from the integrating unit 415p becomes very large (if, for example, a very high angular velocity is produced due to panning of the camera), the integrating unit 415p is reset to prevent arithmetic saturation (overflow).

Referring to FIG. 14, the arithmetic circuit 47p incorporates the DC cut filter/amplifier 48p and the low-pass filter/amplifier 49p. Obviously, however, these units may be incorporated in the camera shake detection unit 45p.

FIGS. 15A to 15C show the arrangement of the image blur compensation apparatus 50 disclosed in Japanese Patent Laid-Open No. 10-181343. FIG. 15A is a front view of the image blur compensation apparatus 50. FIG. 15B is a view taken from the direction indicated by an arrow 51 in FIG. 15A. FIG. 15C is a sectional view taken along a line A-A in FIG. 15A.

As shown in FIG. 15C, the compensation lens 52 comprises two lenses 52a and 52b fixed to the holding frame 53 and a lens 52c fixed to a base plate 54, and serves as part of the photographing optical system.

A yoke 55 made of a ferromagnetic material is mounted on the holding frame 53, and permanent magnets 56p and 56y made of neodymium or the like are fixed onto the behind of the yoke 55 by magnetic attraction (see FIG. 15C). In addition, three sustention axes 53a radially extending from the holding frame 53 at equal angular intervals (at 120° intervals) are fixed in long holes 54a formed in a side wall 54b of the base plate 54 (see FIG. 15A).

As shown in FIG. 15B, in consideration of the relationship between the sustention axes 53a and the long holes 54a, since they are fitted in the direction of an optical axis 57 (see FIG. 15C) of the compensation lens 52, the sustention axes 53a do not move around. In contrast, the long holes 54a extend in the direction perpendicular to the optical axis 57. Therefore, the holding frame 53 is prohibited from moving in the direction of the optical axis 57, but can freely move within a plane perpendicular to the optical axis 57 (in the directions indicated by arrows 58p, 58y, and 58r shown in FIG. 15A). However, since extension coil springs 59 are provided between pins 53b on the holding frame 53 and pins 54c on the base plate 54, the movement of the holding frame 53 in the respective directions (58p, 58y, and 58r) is elastically prohibited.

As shown in FIG. 15A, coils 510p and 510y (partly indicated by the broken lines) are attached to the base plate 54 so as to face the permanent magnets 56p and 56y. The yoke 55, permanent magnet 56p, and coil 510p are arranged as shown in FIG. 15C (the permanent magnet 56y and the coil 510y are arranged in the same manner). When a current is supplied to the coil 510p, the holding frame 53 is driven in the direction indicated by the arrow 58p. When a current is supplied to the coil 510y, the holding frame 53 is driven in the direction indicated by the arrow 58y. The driving amounts of the holding frame 53 are determined by the balances between thrusts produced in association with the spring constants of the extension coil springs 59 in the respective directions and the coils 510p and 510y and the permanent magnets 56p and 56y. That is, the displacement (shift) amount of the compensation lens 52 can be controlled on the basis of the amounts of currents supplied to the coils 510p and 510y.

The image blur compensation apparatus 50 described above is mounted in a camera, and hence is required to be efficiently driven while suppressing power consumption to a minimal. In addition, in a recent digital camera, the image sensing device 44 has greatly reduced in size. As the size of image sensing device 44 decreases in this manner, the image blur compensation apparatus 50 inside the camera is required to be driven with higher accuracy.

As another associated technique, an image blur compensation apparatus designed to improve the driving efficiency by optimally setting a driving force in each direction has also been proposed (see Japanese Patent Laid-Open No. 10-174470). In addition, there has been proposed an image blur compensation apparatus designed to perform driving in two directions by using driving means arranged at 120° intervals, which can realize efficient driving by generating different resultant forces in different directions, e.g., aligning the resultant forces in a direction in which large image blur has occurred. For reference, see Japanese Patent Laid-Open No. 5-257088.

The following problem arises in the image blur compensation apparatus disclosed in Japanese Patent Laid-Open No. 10-174470. Although driving load based on the weight of the image blur compensation apparatus is distributed to the driving means in a well-balanced manner, a pair of driving means differ in driving force and type. For this reason, when the two driving means are driven for free driving operation in the two axis directions, accurate driving operation cannot be performed.

The following problem arises in the image blur compensation apparatus disclosed in Japanese Patent Laid-Open No. 5-257088. Since a compensation lens is moved (swung) by being biased by a motor and a driving lever, a deterioration in response is caused by backlash between the compensation lens and the driving lever or a deterioration in driving accuracy due to friction.

In addition, in each of the image blur compensation apparatuses in the Japanese Patent Laid-Open Nos. 10-174470 and 5-257088, each driving means is not designed to be provided on the member which holds the compensation lens so as to be integrally driven, and hence it lacks in accuracy and response.

SUMMARY OF THE INVENTION

A characteristic feature of the present invention is to solve the problems in the related art.

The first feature of the present invention is to provide an image blur compensation apparatus and optical apparatus which can perform image blur compensation with high accuracy and improve driving efficiency.

The second characteristic feature of the present invention is to provide an image blur compensation apparatus and optical apparatus which are compact in size and can perform high-accuracy image blur compensation.

The third characteristic feature of the present invention is to provide an image blur apparatus and optical apparatus which can improve driving accuracy.

According to an aspect of the present invention, there is provided with an image blur compensation apparatus comprising:

a holding unit configured to hold a lens for compensating for image blur;

a first driving unit and a second driving unit having functionally equivalent members each other, each unit configured to drive the holding unit in accordance with a driving signal; and an image blur compensation unit configured to compensate for the image blur by driving the holding unit within a plane perpendicular to an optical axis using a resultant force generated by applying driving signals to the first driving unit and the second driving unit, wherein the first driving unit and the second driving unit are arranged such that a resultant force which acts on the holding unit when in-phase driving signals of the same amount are applied to the first driving unit and the second driving unit differs in magnitude from a resultant force which acts on the holding unit when reverse-phase driving signals of the same amount are applied to the first driving unit and the second driving unit, and directions of the resultant forces are perpendicular to each other.

According to another aspect of the present invention, there is provided with an image blur compensation apparatus comprising:

a holding unit configured to hold a lens for compensating for image blur;

a plurality of driving units, each unit having functionally equivalent members each other, configured to drive the holding unit;

a plurality of sustention axes extended radially from the holding unit, configured to sustain the holding unit so as to allow the holding unit to move in the radial direction and prohibit the holding unit from moving in an optical axis direction; and a image blur compensation unit configured to compensate for the image blur by driving the holding unit in a two-dimensional direction within a plane perpendicular to an optical axis by using a resultant force generated by applying driving signals to the plurality of driving units, wherein each of the plurality of driving units is arranged in the middles between each adjacent the sustention axes on the holding unit.

According to another aspect of the present invention, there is provided with a image blur compensation apparatus comprising:

a holding unit configured to hold a lens for compensating for image blur;

a plurality of driving units, each unit having functionally equivalent members to each other, configured to drive the holding unit;

a plurality of sustention axes extended radially from the holding unit, configured to sustain the holding unit so as to allow the holding unit to move in the radial direction and prohibit the holding unit from moving in an optical axis direction; and an image blur compensation unit configured to compensate for the image blur by driving the holding unit in a two-dimensional direction within a plane perpendicular to an optical axis by using a resultant force generated by applying driving signals to the plurality of driving units, wherein at least one of the plurality of driving units is placed such that a direction of a driving force therefrom is aligned with a radial direction in which the sustention axis extends.

According to another aspect of the present invention, there is provided with an optical apparatus comprising a image blur compensation apparatus comprising:

a holding unit configured to hold a lens for compensating for image blur;

a first driving unit and a second driving unit having functionally equivalent members each other, each unit configured to drive the holding unit in accordance with a driving signal; and an image blur compensation unit configured to compensate for the image blur by driving the holding unit within a plane perpendicular to an optical axis using a resultant force generated by applying driving signals to the first driving unit and the second driving unit, wherein the first driving unit and the second driving unit are arranged such that a resultant force which acts on the holding unit when in-phase driving signals of the same amount are applied to the first driving unit and the second driving unit differs in magnitude from a resultant force which acts on the holding unit when reverse-phase driving signals of the same amount are applied to the first driving unit and the second driving unit, and directions of the resultant forces are perpendicular to each other.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15A is a front view of an image blur compensation apparatus 50;

FIG. 15B is a view taken along the direction indicated by the arrow 51 in FIG. 15A; and FIG. 15C is a sectional view taken along a line A-A in FIG. 15A.

DETAILED DESCRIPTION OF THE PREFERRED EMBODIMENTS

As the best mode for carrying out the present invention, the first and second embodiments will be described below.

Figure 12:
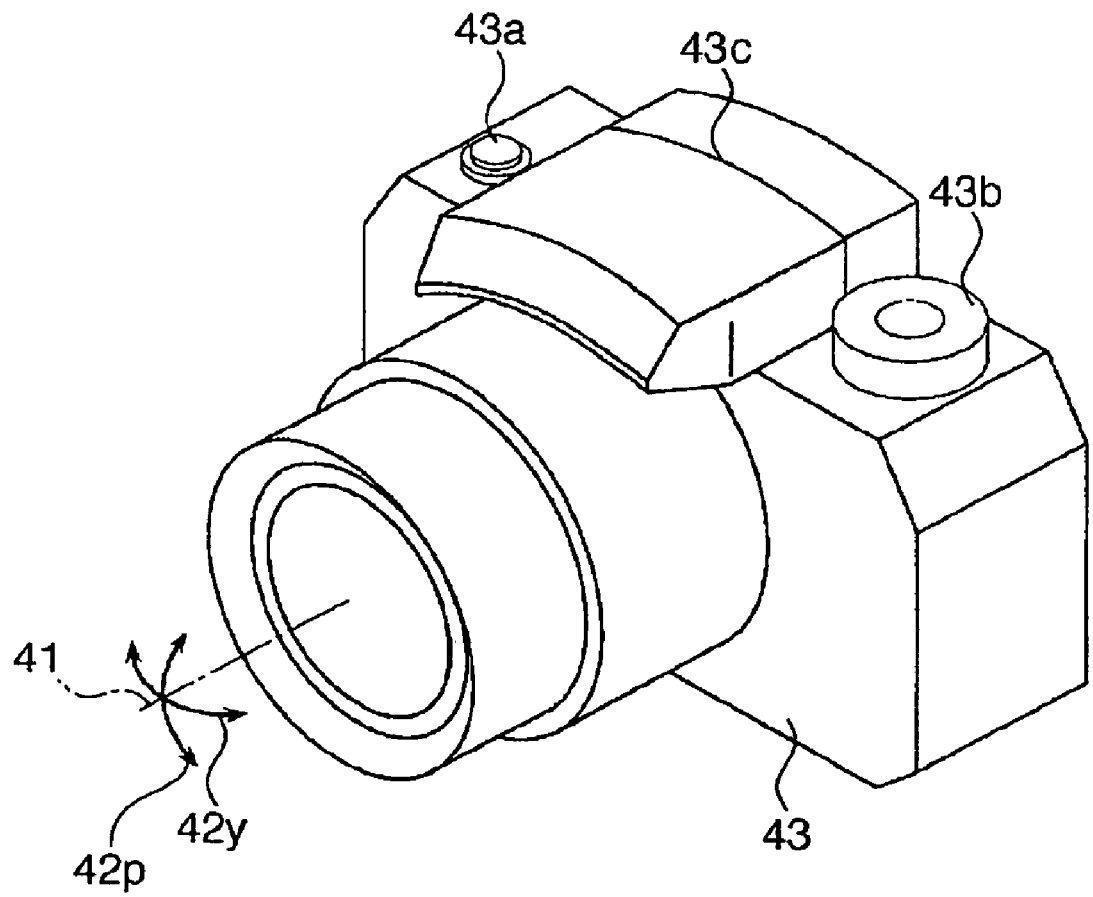
FIG. 12 is a perspective view of a camera including an image blur compensation apparatus according to a technique associated with the present invention.

Note that an image blur compensation apparatus to be described below can be mounted in an optical apparatus such as a camera or a lens unit. The relationship between the image blur compensation apparatus and the optical apparatus is equivalent to the relationship between the image blur compensation apparatus shown in FIG. 13 and the camera shown in FIG. 12. Obviously, the image blur compensation apparatus of the present invention which will be described in each embodiment has an arrangement and characteristics different from those of the image blur compensation apparatus shown in FIG. 13.

First Embodiment

Figure 1:
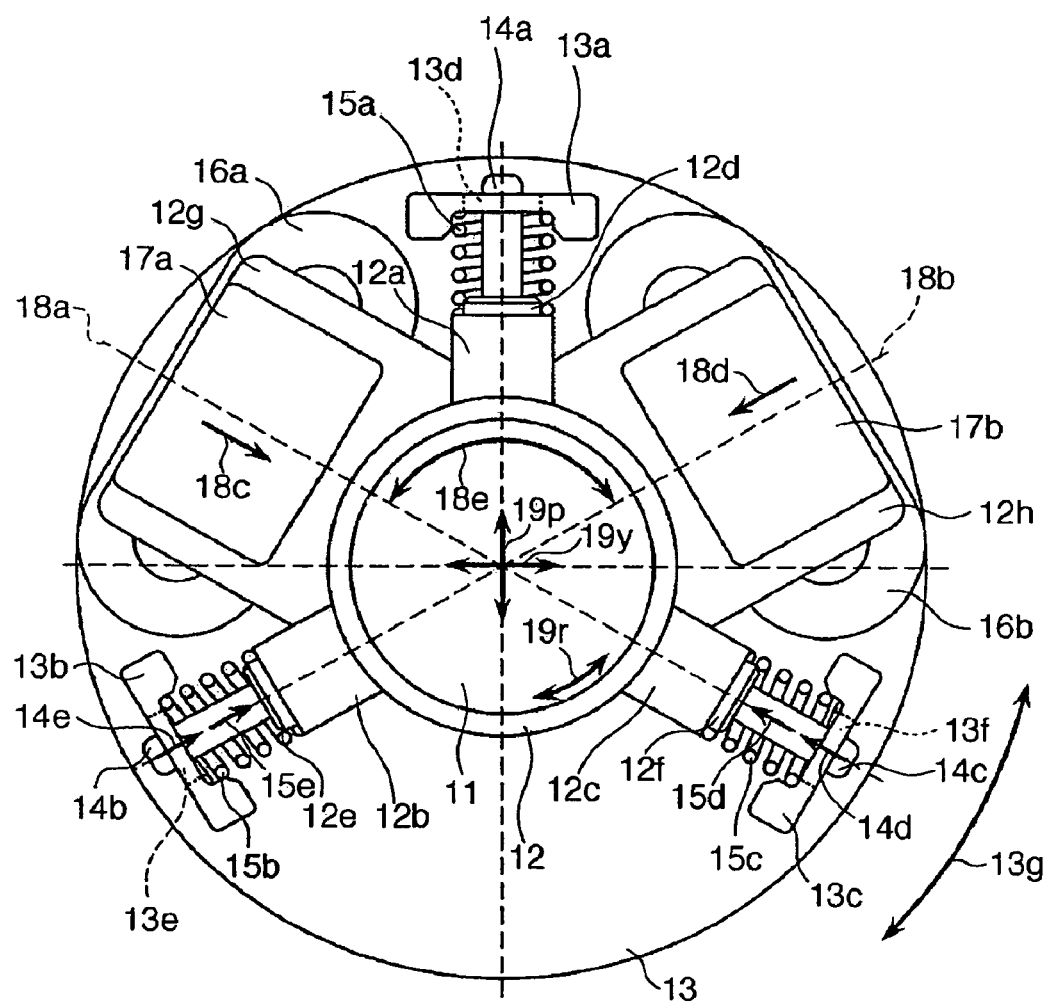
FIG. 1 is a front view showing an image blur compensation apparatus according to the first embodiment of the present invention.
Figure 2:
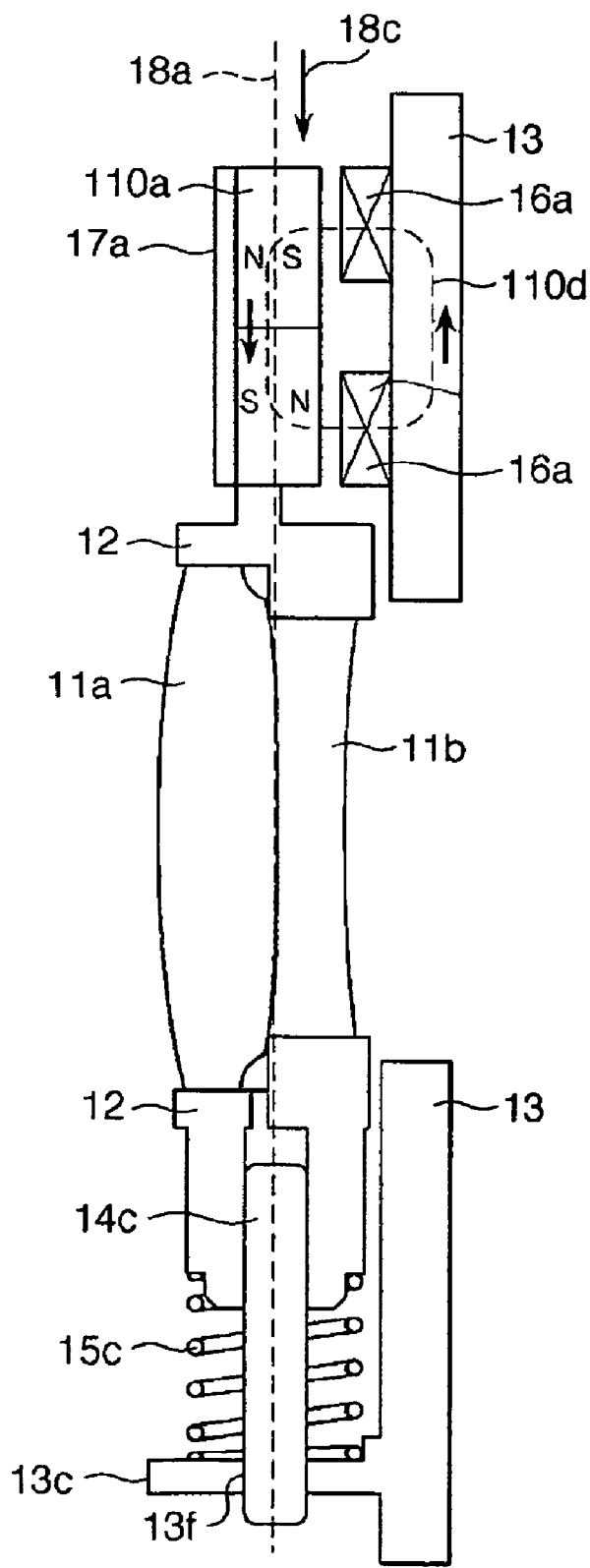
FIG. 2 is a sectional view taken along the direction of an axis 18a in FIG. 1.

FIG. 1 is a front view showing the image blur compensation apparatus according to the first embodiment of the present invention. Referring to FIG. 1, reference numeral 11 denotes a compensation lens (comprising lenses 11a and 11b as shown in FIG. 2 to be described later) for compensating for image blur; numeral 12 denotes a holding frame which holds the compensation lens 11; and numeral 13 denotes the base plate of the image blur compensation apparatus.

The holding frame 12 is provided with arms 12a, 12b, and 12c radially arranged at 120° intervals. Sustention axes 14a, 14b, and 14c, each made of a stainless steel member or the like having a smooth surface, are press-fitted into the arms 12a, 12b, and 12c, respectively. The base plate 13 is provided with three side walls 13a, 13b, and 13c. The three sustention axes 14a, 14b, and 14c radially extending from the arms 12a, 12b, and 12c of the holding frame 12 are fitted in long holes 13d, 13e, and 13f formed in the side walls 13a, 13b, and 13c. The arrangement of each of the side walls 13a, 13b, and 13c is the same as that of the long hole 54a in FIG. 15B.

As also shown in FIG. 15B, the three sustention axes 14a, 14b, and 14c are fitted in the long holes 13d, 13e, and 13f in the optical axis direction of the compensation lens 11 (perpendicular to FIG. 1) so as not to produce any backlash. However, since the long holes 13d to 13f extend in a direction perpendicular to the optical axis (a circumferential direction 13g of the base plate 13 in FIG. 1), the holding frame 12 can freely move within a plane perpendicular to the optical axis (a pitch direction 19p, yaw direction 19y, and roll direction 19r). Note, however, that arm distal end portions 12d, 12e, and 12f are fitted in the inner diameters of compression coil springs 15a, 15b, and 15c. In addition, the outer diameters of the compression coil springs 15a, 15b, and 15c are fitted in the side walls 13a, 13b, and 13c. With this arrangement, the movement of the holding frame 12 in the respective directions (the pitch direction 19p, yaw direction 19y, and roll direction 19r) is elastically prohibited.

Yokes 17a and 17b made of a ferromagnetic material are mounted on ear portions 12g and 12h of the holding frame 12. Permanent magnets 110a and 110b (to be described later with reference to FIG. 2) made of neodymium or the like (hidden by the yokes 17a and 17b in FIG. 1) are fixed onto the behind of the yokes 17a and 17b by magnetic attraction in FIG. 1. Coils 16a and 16b are mounted on the base plate 13 to face the permanent magnets 110a and 110b (to be described later with reference to FIG. 2).

FIG. 2 is a sectional view taken along the direction of an axis 18a indicated by the dotted line in FIG. 1. FIG. 2 shows the arrangement of the yoke 17a, permanent magnet 11a, and coil 16a. Although the yoke 17b, permanent magnet 110b, coil 16b, and the like can be observed on a cross-section taken along the direction of an axis 18b indicated by the dotted line in FIG. 1, since the arrangement of them is the same as that shown in FIG. 2, a description thereof will be omitted.

As shown in FIG. 2, a magnetic flux 110d from the permanent magnet 110a flows toward the coil 16a. If, therefore, a current is supplied to the coil 16a, the holding frame 12 is driven in the direction indicated by an arrow 18c. Likewise, as shown in FIG. 1, when a current is supplied to the coil 16b, the holding frame 12 is driven in the direction indicated by an arrow 18d. The driving amounts of the holding frame 12 are determined by the balances between thrusts produced in association with the spring constants of the compression coil springs 15a, 15b, and 15c in the respective directions and the coils 16a and 16b and the permanent magnets 110a and 110b. That is, the displacement (shift) amount of the compensation lens 11 can be controlled by controlling the amounts of currents to be supplied to the coils 16a and 16b.

The coil 16a, sustention axis 14c, compression coil spring 15c, and the like are arranged such that the driving forces generated by the coils 16a and 16b act in the same directions as the extending directions of the sustention axes 14c and 14b and the directions of the compression coil springs 15c and 15b. In addition, the coil 16a, sustention axis 14c, compression coil spring 15c, and the like are arranged such that the centers of the driving forces generated by the coils 16a and 16b become coaxial with the extending directions of the sustention axes 14c and 14b and the compression coil springs 15c and 15b. For this reason, the respective driving forces face centers 14d and 14e of frictional resistances produced between the sustention axes 14c and 14b and the long holes 13f and 13e and spring forces 15d and 15e of the compression coil springs 15c and 15b. This makes it possible to realize accurate driving operation even in the presence of friction.

As shown FIG. 1, the sustention axes 14a, 14b, and 14c extending radially in the three directions are arranged at 120° (see an arrow 18e) intervals. The coil 16a is placed in the middle between the sustention axes 14a and 14b. Likewise, the coil 16b is placed in the middle between the sustention axes 14c and 14a. With this arrangement, the image blur compensation apparatus can be made compact without any waste of space.

The manner of how the holding frame 12 is driven in the pitch direction 19p and yaw direction 19y by supplying currents to the pair of coils 16a and 16b will be described below.

Figure 3:
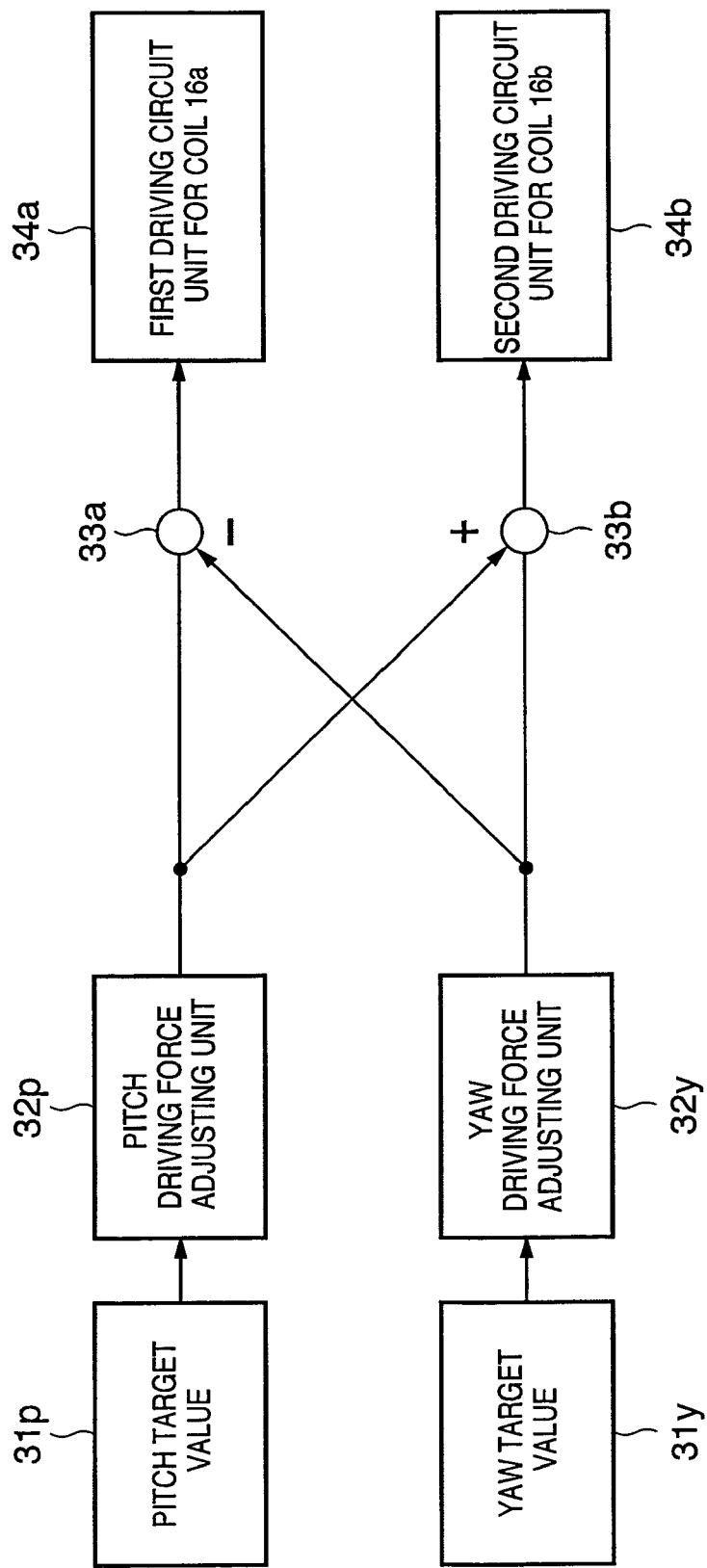
FIG. 3 is a block diagram showing a circuit arrangement required for the driving operation of the image blur compensation apparatus according to the first embodiment of the present invention in the pitch and yaw directions.

FIG. 3 is a block diagram showing the arrangement of a circuit to be used when the image blur compensation apparatus according to this embodiment is driven in the pitch direction 19p and yaw direction 19y. A pitch target value 31p and a yaw target value 31y are target values for driving the image blur compensation apparatus in the pitch direction 19p and yaw direction 19y, respectively. Each pitch target value corresponds to an output from the differential amplifier 418p in FIG. 14. The gains of the pitch target values 31p and 31y are adjusted by a pitch driving force adjusting units 32p and a yaw driving force adjusting unit 32y in accordance with driving forces for the image blur compensation apparatus in the respective driving directions.

Figure 14:
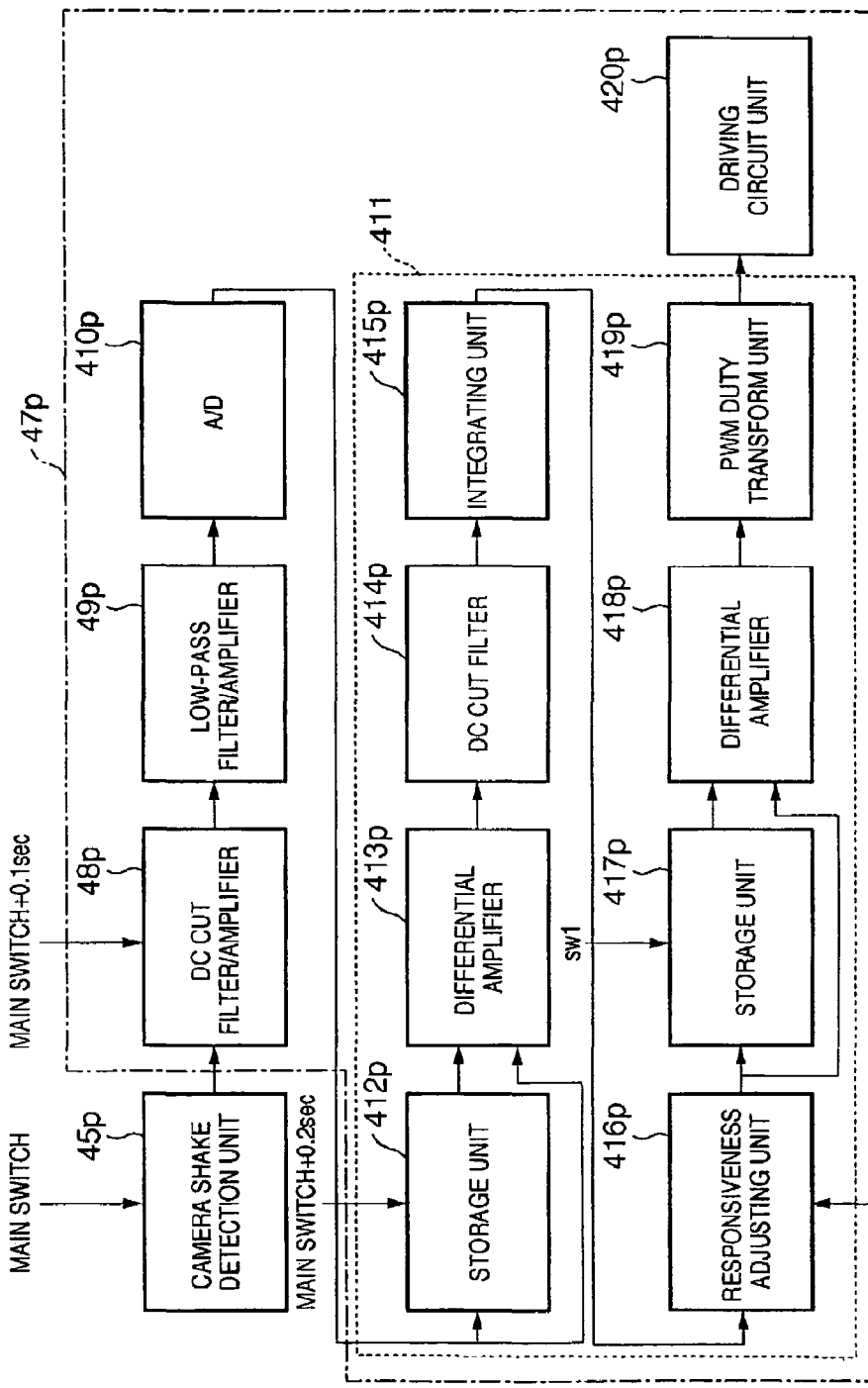
FIG. 14 is a block diagram showing a circuit arrangement associated with an image blur compensation apparatus for the camera in FIG. 12.

Although not shown, the image blur compensation apparatus according to this embodiment also includes constituent elements corresponding to constituent elements such as the camera shake detection unit 45p and DC cut filter/amplifier 48p shown in FIG. 14. With this arrangement, the image blur compensation apparatus according to this embodiment can acquire the pitch target value 31p and the yaw target value 31y.

An output from the pitch driving force adjusting unit 32p whose gain is adjusted is input to a first driving circuit unit 34a (corresponding to the PWM duty transform unit 419p and driving circuit unit 420p in FIG. 14) which drives the coil 16a, and is supplied as a current to the coil 16a. An output from the pitch driving force adjusting unit 32p is input to a second driving circuit 34b which drives the coil 16b through an addition circuit 33b, and is supplied as a current to the coil 16b. That is, outputs from the pitch target value 31p are supplied, to the coils 16a and 16b, as currents which are in phase (indicating that positive or negative currents, i.e., currents of the same polarity, are supplied to both the coils 16a and 16b) and of the same amount.

An output from the yaw driving force adjusting unit 32y whose gain is adjusted is input to the second driving circuit unit 34b which drives the coil 16b, and is supplied as a current to the coil 16b. The output from the yaw driving force adjusting unit 32y is also input to the first driving circuit unit 34a for the coil 16a through an inverting circuit 33a, and is supplied as a current to the coil 16a. That is, outputs from the yaw target value 31y are supplied, to the coils 16a and 16b, as currents which are in reverse phase (indicating that positive and negative currents are supplied to the coil 16a and the coil 16b, respectively, i.e., currents of opposite polarities are supplied) and of the same amount.

Figure 4:
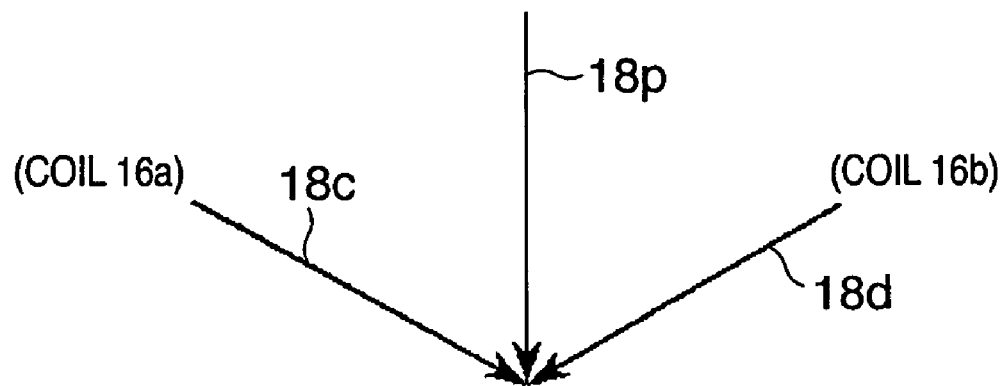
FIG. 4 is a view showing driving balance in the pitch direction in the image blur compensation apparatus according to the first embodiment of the present invention.

When in-phase currents of the same amount are supplied to the coils 16a and 16b, the coil 16a generates a driving force in the direction indicated by the arrow 18c, and the coil 16b generates a driving force in the direction indicated by the arrow 18d, as shown in FIG. 4. As a consequence, the resultant force becomes a driving force along the pitch direction 19p, as indicated by the arrow 18p. In addition, since the two coils 16a and 16b are arranged at 120° intervals, halves of the driving forces generated by the coils 16a and 16b at this point of time are combined to generate the same driving force as that generated by one of the coils 16a and 16b.

Figure 5:
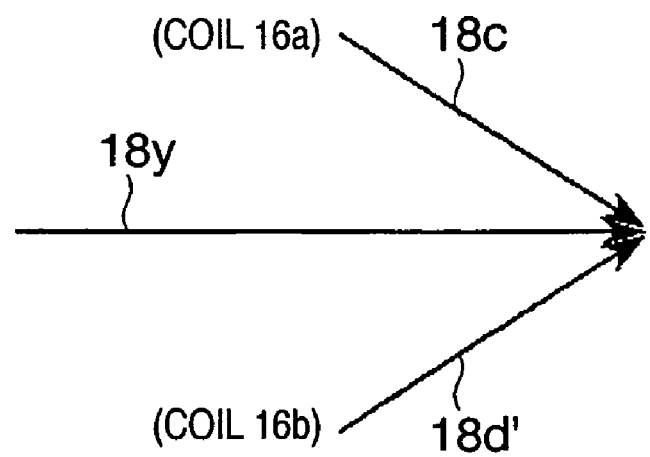
FIG. 5 is a view showing driving balance in the yaw direction in the image blur compensation apparatus according to the first embodiment of the present invention.

When reverse-phase currents of the same amount are supplied to the coils 16a and 16b, the coil 16a generates a driving force in the direction indicated by an arrow 18c and the coil 16b generates a driving force in a direction 18d', as shown in FIG. 5. As a consequence, the resultant force becomes a driving force along the yaw direction 19y, as indicated by an arrow 18y. In addition, since the two coils 16a and 16b are arranged at 120° intervals, $\sqrt{(3)}/2$ of the driving forces generated by the coils 16a and 16b at this point of time are combined to generate $\sqrt{(3)}$ times the driving force generated by one of the coils 16a and 16b. With this arrangement, when driving operation is to be performed in the yaw direction 19y, a driving force $\sqrt{(3)}$ times the driving force generated by one of the coils 16a and 16b is generated. That is, a smaller driving force can generate a larger driving force in this direction (19y). On the other hand, there is no increase in driving force for driving operation in the pitch direction 19p.

As described above, since different driving forces (resultant forces) are generated in the pitch direction 19p and yaw direction 19y, the pitch driving force adjusting unit 32p and the yaw driving force adjusting unit 32y are provided to match such driving forces. It suffices to perform adjustment by using the responsiveness adjusting unit 416p shown in FIG. 14 (the responsiveness adjusting unit in the yaw direction is not shown in FIG. 14) instead of providing the driving force adjusting units 32p and 32y behind the target values 31p and 31y, as shown in FIG. 3. In this case, the driving force adjusting units 32p and 32y are provided before the pitch target value 31p and yaw target value 31y.

Figure 6:
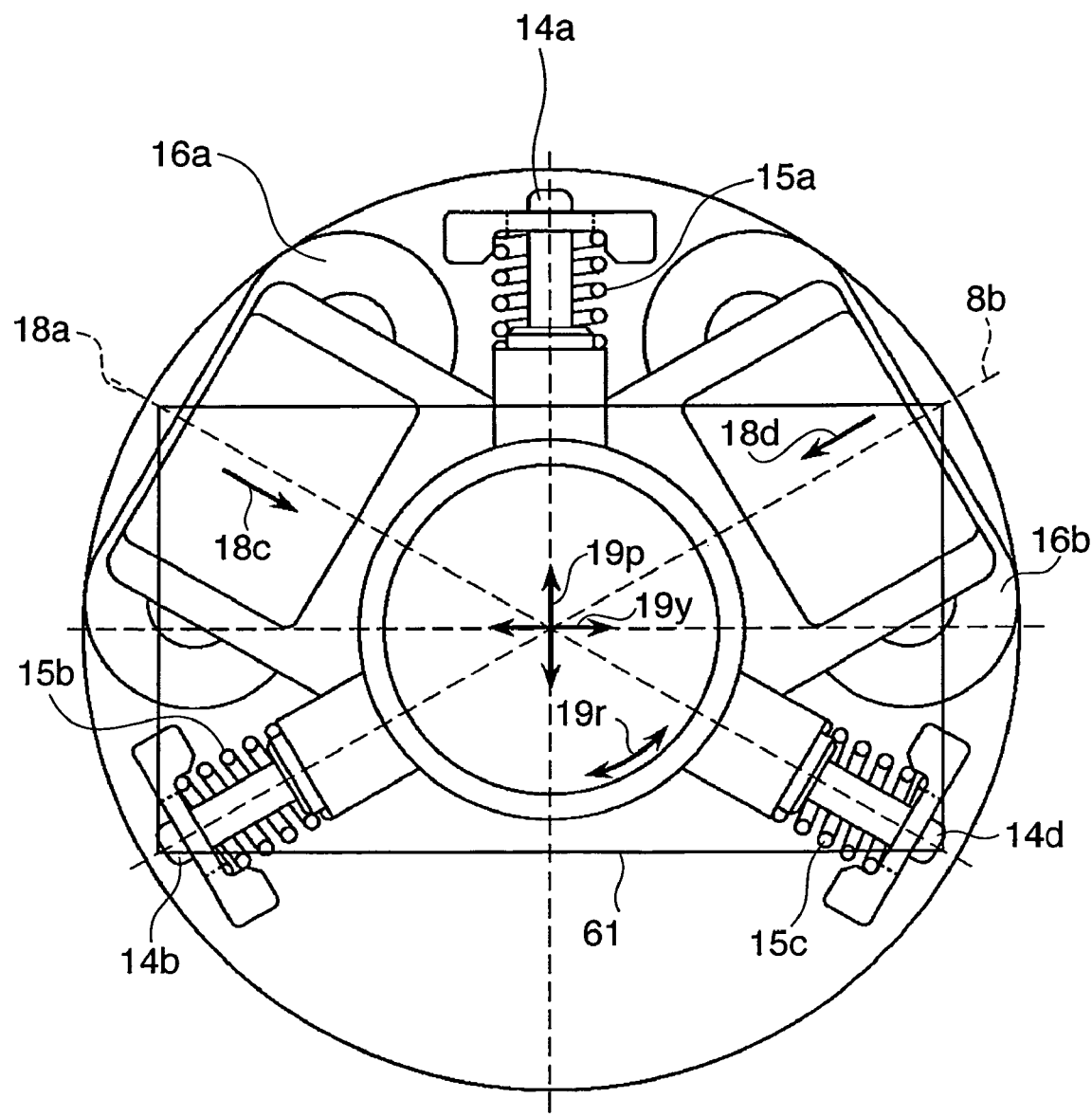
FIG. 6 is a view for explaining the range of driving forces at the time of inputting of a predetermined unit of the electric current in the image blur compensation apparatus according to the first embodiment of the present invention.

FIG. 6 shows driving amounts obtained when a predetermined unit of the electric current is supplied to each of the coils 16a and 16b, and a rectangular frame 61 indicates the driving amounts. The driving amount of the holding frame 12 is determined by the balance between the driving forces generated by the coils 16a and 16b and the spring forces of the coil springs 15a, 15b, and 15c. As described above, the coils 16a and 16b are arranged at 120° intervals. For this reason, the driving force in the pitch direction 19p is the weakest, the driving force in the diagonal directions of the rectangular frame 61 (the directions of the axes 18a and 18b of the sustention axes 14c and 14b) is the strongest, and the rectangular frame 61 has an oblong shape. As a consequence, an image blur compensation amount in the yaw direction 19y per predetermined unit of the electric current becomes larger than that in the pitch direction 19p.

Figure 7:
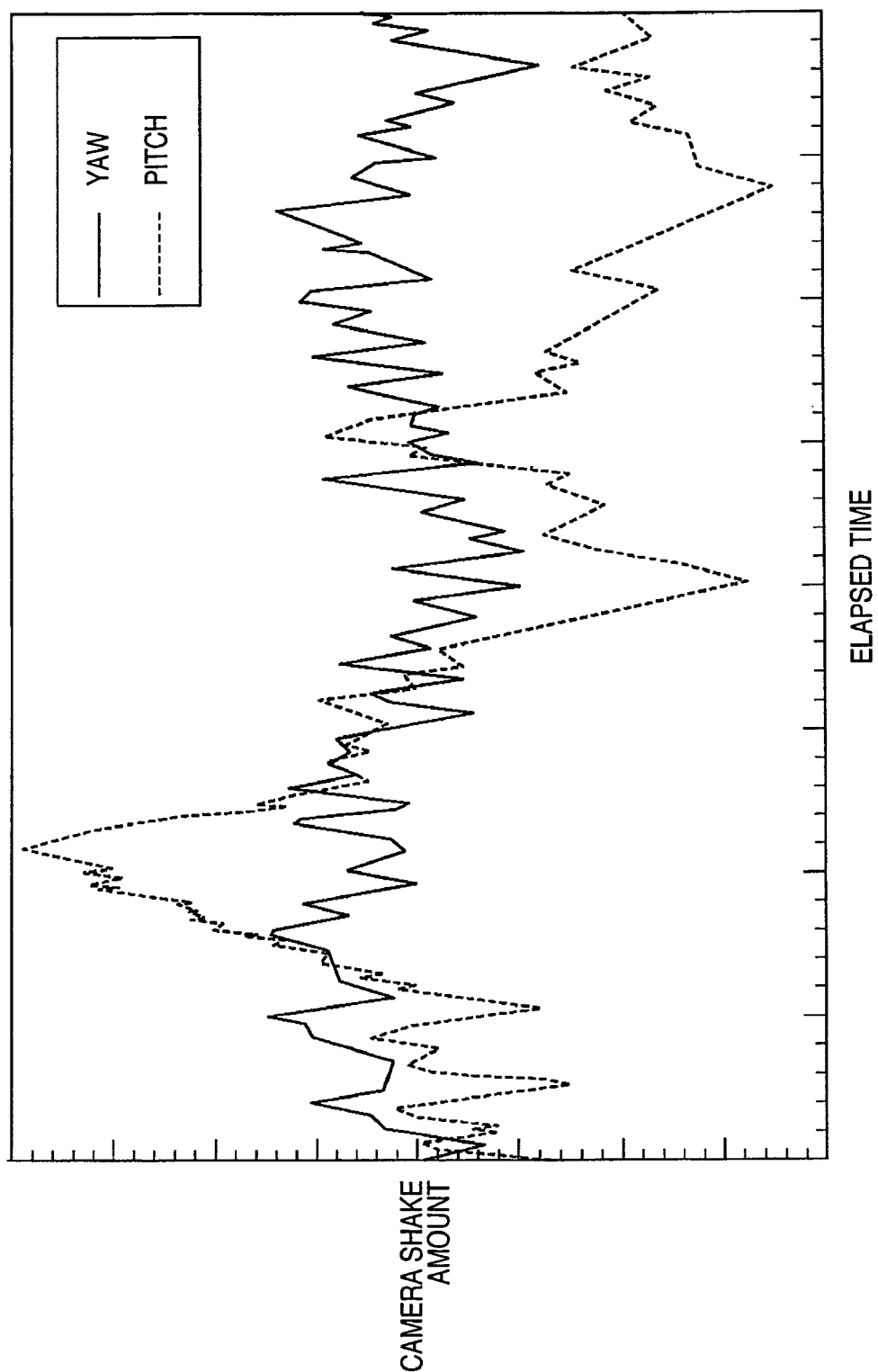
FIG. 7 is a graph for explaining camera shake characteristics in the image blur compensation apparatus according to the first embodiment of the present invention.

FIG. 7 is a graph showing an example of the amount of typical camera shake applied to the camera in each direction.

Referring to FIG. 7, the abscissa represents the elapsed time between the time when the photographer points the camera at an object to be photographed and the time when photography is performed, and the ordinate represents the amount (angle) of camera shake at the corresponding time.

Figure 13:
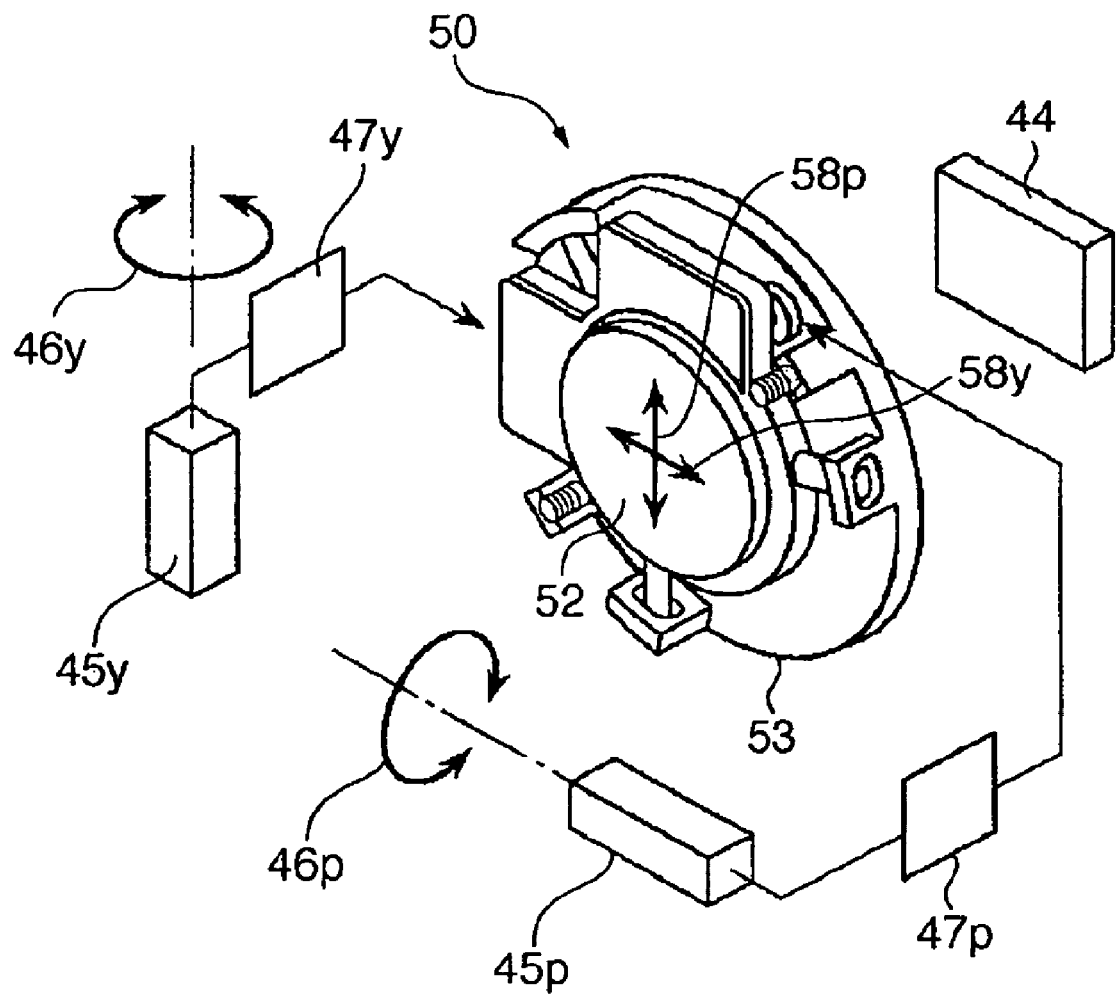
FIG. 13 is a view showing the arrangement of the main part of the camera in FIG. 12.

Referring to FIG. 7, the solid line represents shake in the horizontal direction of the camera (yaw in the direction indicated by an arrow 42y in FIG. 13), and the broken line represents shake in the vertical direction of the camera (pitch in the direction indicated by an arrow 42p in FIG. 13).

As is obvious from FIG. 7, the amount of camera shake in the yaw direction is nearly twice that in the pitch direction. The phenomenon in which image blur in the yaw direction becomes larger than that in the pitch direction is especially noticeable in a case where the photographer holds the camera with his/her one hand and performs photography while observing the liquid crystal monitor on the back surface of the (digital) camera.

It can be determined from the tendency shown in FIG. 7 and the method of holding the camera that the amount of blur of an object image on an imaging plane due to shake applied to the camera is represented by a shape similar to the rectangular frame 61 in FIG. 6.

That is, the image blur compensation amount in the direction indicated by the arrow 19y in FIG. 6 (the compensation amount of the image blur compensation apparatus for compensating image blur in the yaw direction 43y) becomes larger than that (the compensation amount of the image blur compensation apparatus for compensating image blur in the pitch direction 43p) in the direction indicated by the arrow 19p, and hence the rectangular frame 61 has an oblong shape.

Obviously, therefore, the image blur compensation apparatus of this embodiment which generates a large driving force ("the compensation amount per predetermined unit of the electric current" described above) in the direction indicated by the arrow 19y in accordance with this shape can efficiently perform image blur compensation.

As described above, according to the first embodiment, the driving means comprising the yokes 17a and 17b, the permanent magnets 110a and 110b, and the coils 16a and 16b and the holding frame 12 are optimally arranged. This arrangement simultaneously satisfies three requirements, i.e., a reduction in the size of the image blur compensation apparatus, an improvement in driving accuracy, and an increase in driving efficiency.

More specifically, the image blur compensation apparatus comprises identical members. That is, this apparatus comprises the first driving means (the yoke 17a, permanent magnet 110a, and coil 16a) and the second driving means (the yoke 17b, permanent magnet 110b, and coil 16b) which are of the same type and have the same shape. The resultant force which acts on the holding frame 12 which holds the compensation lens 11 when in-phase driving signals of the same amount are applied to the first and second driving means differs in magnitude from the resultant force which acts on the holding frame 12 when reverse-phase driving signals of the same amount are applied to the first and second driving means. These driving means are arranged on the holding frame 12 and the base plate 13 such that the directions of these resultant forces are perpendicular to each other.

This arrangement makes it possible to align the direction of a larger one of the different resultant forces with the direction in which a large force for compensating image blur is required (the direction in which image blur caused when the camera is moved in the horizontal direction can be compensated for), as shown in FIGS. 6 and 7. That is, the first and second driving means can be arranged on the holding frame 12 and the base plate 13 in the above manner. This makes it possible to perform driving operation corresponding to the direction in which image blur is large and improve the driving efficiency of image blur compensation. In addition, the first and second driving means are directly arranged on the holding frame 12 and the base plate 13. Therefore, this image blur compensation apparatus can improve the accuracy of image blur compensation as compared with the image blur compensation apparatuses disclosed in Japanese Patent Laid-Open Nos. 10-174470 and 5-257088.

In addition, the image blur compensation apparatus comprises the sustention axes 14a to 14c which extend radially from the holding frame 12 at equal angular intervals, support the holding frame 12 so as to make it movable in the radial direction, and prohibit the holding frame 12 from moving in the optical axis direction. The first and second driving means comprising identical members are arranged on the holding frame 12 so as to be located in the middle between the adjacent sustention axes 14a and 14b and in the middle between the sustention axes 14a and 14c (the "middle" includes a substantial middle). With this arrangement, each driving means can be placed in the middle between the sustention axes which becomes a dead space, thereby achieving a reduction in the size of the image blur compensation apparatus.

In the image blur compensation apparatus, the first and second driving means are arranged on the holding frame 12 and the base plate 13 such that the directions of the respective driving forces (the directions indicated by arrows 18c, 18d, and 18d') are aligned with the radial direction in which the sustention axes 14b and 14c extend. This makes the direction of the driving force generated by each driving means align (coincide) with the direction in which each holding unit holds the corresponding sustention axis, thereby realizing accurate driving operation even with friction.

In addition, in the image blur compensation apparatus, the coil springs 15a to 15c are arranged such that the elastic directions of the coil springs 15a to 15c which bias the holding frame 12 driven in the direction of image blur compensation toward the initial position are aligned with the directions in which the holding frame 12 is held by the sustention axes 14a to 14c. This can improve the response of driving for image blur compensation.

Second Embodiment

Figure 8:
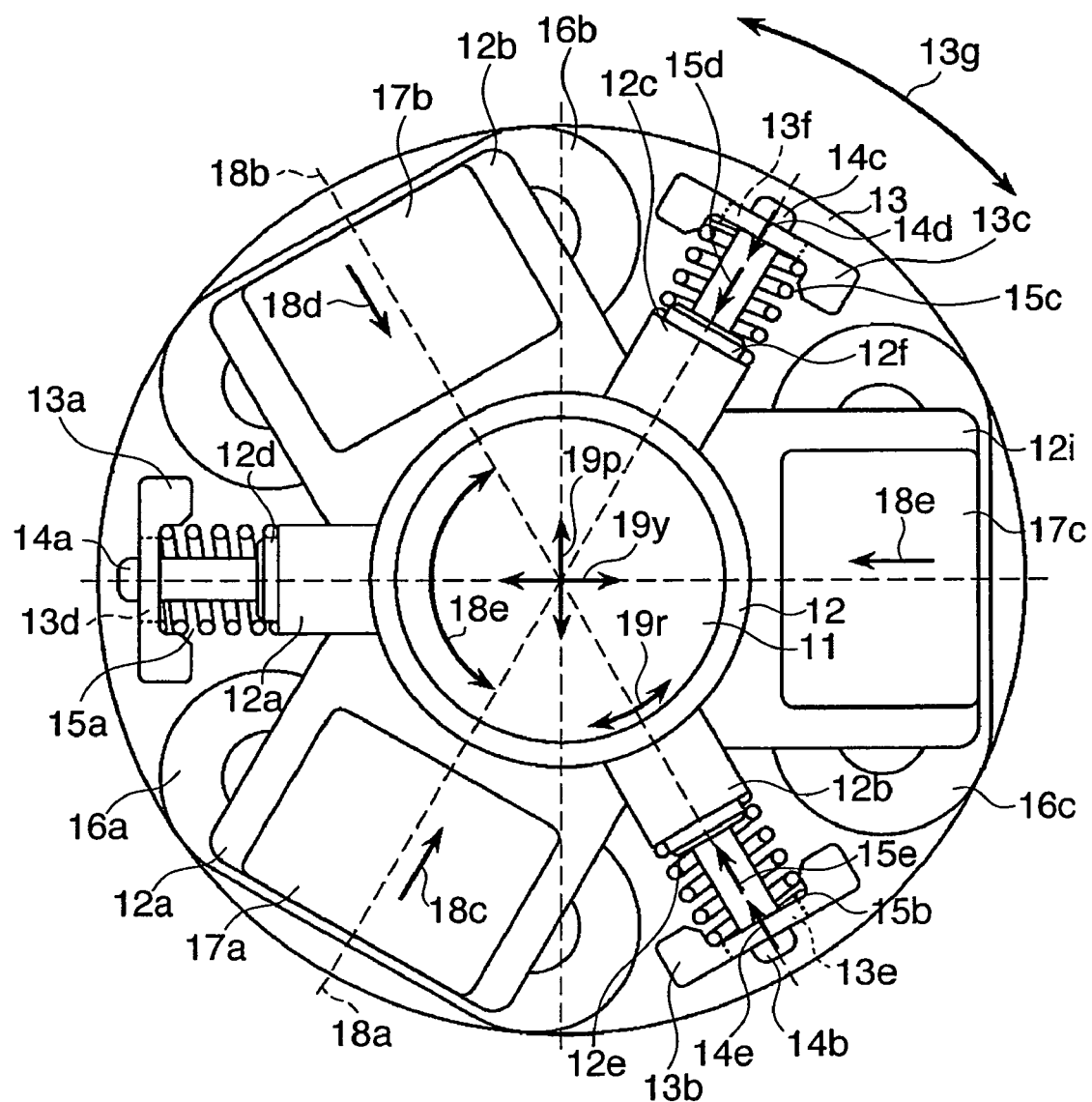
FIG. 8 is a front view showing an image blur compensation apparatus according to the second embodiment of the present invention.

FIG. 8 is a front view showing an image blur compensation apparatus according to the second embodiment of the present invention. The image blur compensation apparatus according to the second embodiment differs from the image blur compensation apparatus according to the first embodiment in the following points. That is, an ear portion 12i is also provided between arms 12b and 12c and between sustention axes 14b and 14c. The ear portion 12i is provided with a yoke 17c made of a ferromagnetic material, and a permanent magnet 110c (not shown) made of neodymium or the like is fixed onto the behind of the yoke 17c by magnetic attraction in FIG. 8. A coil 16c is mounted on a base plate 13 so as to face the permanent magnet 110c. In addition, the yoke 17c, permanent magnet 110c, and coil 16c constituting the third driving means are aligned in a yaw direction 19y, and the positions of the first and second driving means are different from those in the first embodiment. Other arrangements are the same as those in the first embodiment, and hence a description thereof will be omitted.

Figure 9:
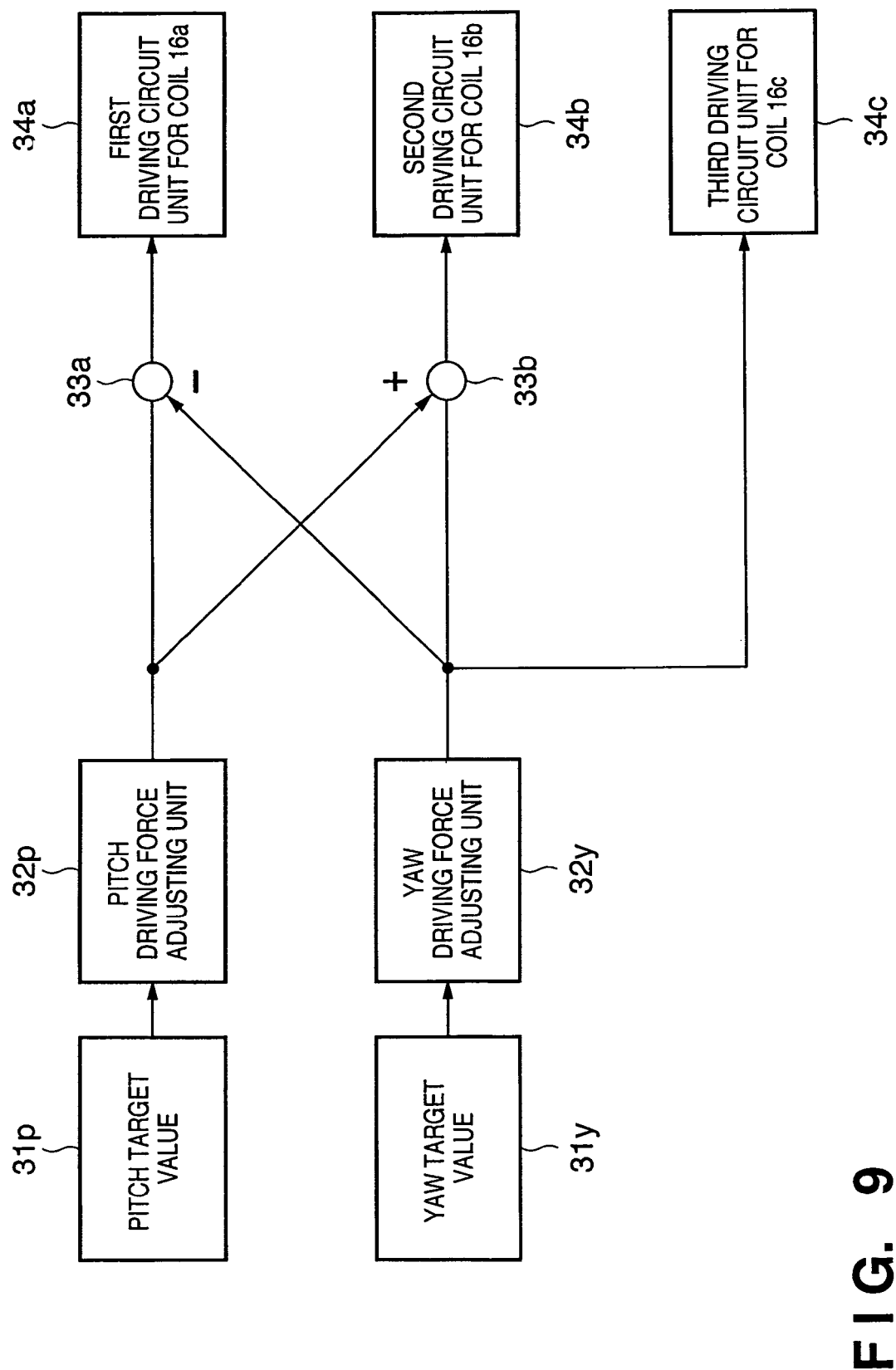
FIG. 9 is a block diagram showing a circuit arrangement required for the driving operation of the image blur compensation apparatus according to the second embodiment of the present invention in the pitch and yaw directions.

FIG. 9 is a block diagram showing the arrangement of a circuit necessary for driving the image blur compensation apparatus having the above arrangement in the pitch and yaw directions.

A pitch target value 31p and a yaw target value 31y are driving target values for driving the image blur compensation apparatus in a pitch direction 19p and a yaw direction 19y, and correspond to the differential amplifier 418p in FIG. 14. The gains of the respective target values are adjusted by a pitch driving force adjusting unit 32p and a yaw driving force adjusting unit 32y in accordance with driving forces for the image blur compensation apparatus in the respective driving directions.

Although not shown, the image blur compensation apparatus according to this embodiment comprises constituent elements corresponding to the respective constituent elements such as the camera shake detection unit 45p and DC cut filter/amplifier 48p shown in FIG. 14. Therefore the image blur compensation apparatus according to this embodiment can acquire the pitch target value 31p and the yaw target value 31y.

An output from the pitch driving force adjusting unit 32p whose gain is adjusted is input to a first driving circuit unit 34a (corresponding to the PWM duty transform unit 419p and driving circuit unit 420p in FIG. 14) for a coil 16a, and is supplied as a current to the coil 16a. An output from the pitch driving force adjusting unit 32p is input to a second driving circuit unit 34b for a coil 16b through an inverting circuit 33a, and is supplied as a current to the coil 16b. That is, signals from the pitch target value 31p are supplied as reverse-phase currents of the same amount to the coils 16a and 16b.

An output from the yaw driving force adjusting unit 32y is input to the second driving circuit unit 34b for the coil 16b, and is supplied as a current to the coil 16b. An output from the yaw driving force adjusting unit 32y is input to the first driving circuit unit 34a for the coil 16a through an addition circuit 33b, and is supplied as a current to the coil 16a. That is, signals from the yaw target value 31y are supplied as in-phase currents of the same amount to the coils 16a and 16b. In addition, an output from the yaw driving force adjusting unit 32y is also input to a third driving circuit unit 34c for the coil 16c, and is supplied as a current to the coil 16c.

Figure 10:
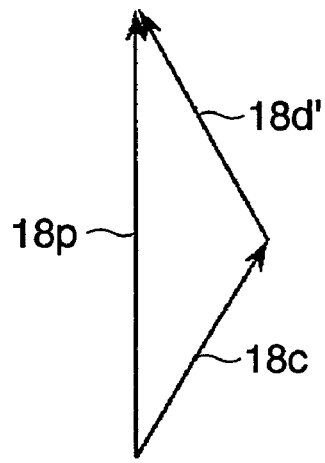
FIG. 10 is a view showing driving balance in the pitch direction in the image blur compensation apparatus according to the second embodiment of the present invention.

When reverse-phase currents of the same amount are supplied to the coils 16a and 16b, the coil 16a generates a driving force in the direction indicted by an arrow 18c, and the coil 16b generates a driving force in a direction 18d', as shown in FIG. 10. The resultant force therefore acts as a driving force along the pitch direction 19p as indicated by an arrow 18p. In addition, since the two coils 16a and 16b are arranged at 120° intervals, $\sqrt{3}/2$ of driving forces from the coils 16a and 16b are combined to generate a driving force $\sqrt{3}$ times the driving force generated by the coil 16a or 16b.

Figure 11:
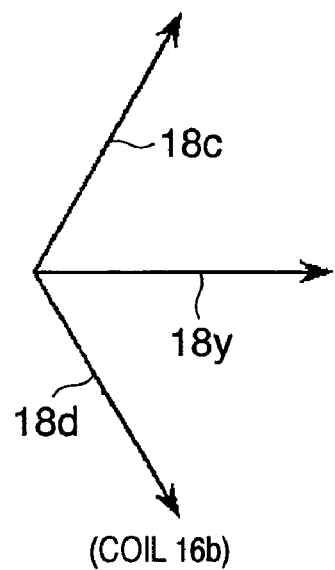
FIG. 11 is a view showing driving balance in the yaw direction in the image blur compensation apparatus according to the second embodiment of the present invention.

When in-phase currents of the same amount are supplied to the coils 16a and 16b, the coil 16a generates a driving force in the direction indicated by an arrow 18c, and the coil 16b generates a driving force in the direction indicated by an arrow 18d, as shown in FIG. 11. The resultant force therefore acts as a driving force along the yaw direction 19y, as indicated by an arrow 18y. At this time, since the two coils 16a and 16b are arranged at 120° intervals, halves of the driving forces from the coils 16a and 16b are combined to generate a driving force equal to that generated by one of the coils 16a and 16b. Note, however, that in driving operation in the yaw direction 19y, a driving force from the coil 16c is also added by the same amount in the same direction, the driving force in the yaw direction 19y is doubled.

With this arrangement, in driving operation in the pitch direction 19p, a driving force $\sqrt{3}$ times the driving force generated by each of the coils 16a and 16b is generated, whereas in driving operation in the yaw direction 19y, a double driving force is generated by the coils 16a and 16c.

As described above, according to camera shake characteristics, a driving force required in the yaw direction is larger than that in the pitch direction, and hence a stronger driving force is also generated in the yaw direction in the first embodiment. In the second embodiment of the present invention as well, the coils are arranged to generate a stronger driving force in the yaw direction, and the third driving means (the yoke 17c, permanent magnet 110c, and coil 16c) is added, thereby increasing driving forces in both the pitch direction and the yaw direction. More specifically, a driving force in the pitch direction 19p is the same as that generated by one of the coils 16a and 16b in the first embodiment. In contrast, in the second embodiment, this driving force is $\sqrt{3}$ times that generated by one of the coils 16a and 16b. A driving force in the yaw direction 19y is $\sqrt{3}$ times that generated by one of the coils 16a and 16b in the first embodiment. In contrast, in the second embodiment, this driving force is equal to the sum of the driving force generated by one of the coils 16a and 16b and the driving force (thrust) generated by the coil 16c, i.e., becomes doubled.

As described above, the image blur compensation apparatus according to the second embodiment comprises the first driving means comprising the yoke 17a, permanent magnet 110a, and coil 16a. This apparatus also comprises the second driving means comprising the yoke 17b, permanent magnet 110b, and coil 16b. The apparatus further comprises the third driving means comprising the yoke 17c, permanent magnet 110c, and coil 16c. Optimally arranging these three driving means and the holding frame 12 makes it possible to simultaneously satisfy three requirements, i.e., a reduction in the size of the image blur compensation apparatus, an improvement in driving accuracy, and an increase in driving efficiency. In addition, driving forces can be increased without increasing the overall size of the image blur compensation apparatus by providing the third driving means in a free space (between the sustention axes 14b and 14c) and providing optimal driving balance between the respective coils as shown in FIG. 9.

More specifically, the image blur compensation apparatus according to the second embodiment comprises identical members, i.e., the first to third driving means of the same type and have the same shape. The resultant force which acts on a holding frame 12 which holds a compensation lens 11 when in-phase driving signals of the same amount are applied to the first and second driving means differs in magnitude from a resultant force which will be described below. This resultant force is a resultant force which acts on the holding frame 12 when reverse-phase driving signals of the same amount are applied to the first and second driving means. The first to third driving means are arranged on the holding frame 12 and the base plate 13 such that the directions of two resultant forces become perpendicular to each other, and the direction of a thrust generated when a driving signal is applied to the third driving means is aligned with the direction of one of the resultant forces having difference in magnitude.

With this arrangement, as described with reference to FIGS. 6 and 7, the direction in which the direction of the thrust generated by the third driving means is aligned with the direction of one of the resultant forces which differ in magnitude is made to coincide with the direction in which a large image blur compensation force is required (the direction in which image blur caused by the movement of the camera in the horizontal direction can be compensated for). The first to third driving means can be arranged on the holding frame 12. Therefore, the driving efficiency of image blur compensation can be improved. In addition, the first to third driving means are directly arranged on the holding frame 12 and the base plate 13. This makes it possible to improve the accuracy of image blur compensation as compared with the image blur compensation apparatuses disclosed in Japanese Patent Laid-Open Nos. 10-174470 and 5-257088.

In addition, the image blur compensation apparatus according to the second embodiment comprises the sustention axes 14*a* to 14*c* which extend radially from the holding frame 12 at equal angular intervals, support the holding frame 12 so as to make it movable in the radial direction, and prohibit the holding frame 12 from moving in the optical axis direction. The first to third driving means comprising identical members are arranged at the following positions. That is, these driving means are arranged on the holding frame 12 so as to be located in the middle between the adjacent sustention axes 14*a* and 14*b*, in the middle between the sustention axes 14*b* and 14*c*, and in the middle between the sustention axes 14*c* and 14*a* (the "middle" includes a substantial middle). With this arrangement, each driving means can be placed in the middle between the sustention axes which becomes a dead space, thereby achieving a reduction in the size of the image blur compensation apparatus.

In addition, in the image blur compensation apparatus according to the second embodiment, the first to third driving means are arranged as follows. That is, these driving means are arranged on the holding frame 12 and the base plate 13 such that the directions of the respective driving forces (the directions indicated by arrows 18*c*, 18*d*, and 18*d'*) are aligned with the radial direction in which the sustention axes 14*a*, 14*b*, and 14*c* extend. This makes the direction of the driving force generated by each driving means be aligned (coincide) with the direction in which each holding unit supports the corresponding sustention axis, thereby realizing accurate driving operation even with friction.

In addition, in the image blur compensation apparatus, coil springs 15*a* to 15*c* are arranged such that the elastic directions of the coil springs 15*a* to 15*c* which bias the holding frame 12 driven in the direction of image blur compensation toward the initial position are aligned with the directions in which the holding frame 12 is held by the sustention axes 14*a* to 14*c*. This can improve the response of driving for compensating image blur.

Each embodiment described above has exemplified the image blur compensation apparatus mounted in the digital camera. However, the image blur compensation apparatus of the present invention can be realized as a compact apparatus with reduced power consumption, and hence can be mounted in a digital video camera, monitor camera, Web camera, cellular phone, and the like as well as a digital camera.

The present invention is not limited to the above embodiment, and various changes and modifications can be made thereto within the spirit and scope of the present invention. Therefore, to apprise the public of the scope of the present invention, the following claims are made.

This application claims the benefit of Japanese Application No. 2005-016267, filed Jan. 25, 2005, which is hereby incorporated by reference herein in its entirety.

What is claimed is:

1. An image blur compensation apparatus comprising:
    a holding unit configured to hold a lens for compensating for image blur;
    a first driving unit and a second driving unit having a magnet and a coil, each unit being configured to drive said holding unit in accordance with a driving signal; and
    an image blur compensation unit configured to compensate for the image blur by driving said holding unit within a plane perpendicular to an optical axis using a resultant force generated by applying driving signals to said first driving unit and said second driving unit,
    wherein said first driving unit and said second driving unit are placed such that a direction of a driving force generated when a driving signal is applied to said first driving unit is not perpendicular to a direction of a driving force generated when a driving signal is applied to said second driving unit, and that a resultant force which acts on said holding unit when in-phase driving signals of the same amount are applied to said first driving unit and said second driving unit differs in magnitude from a resultant force which acts on said holding unit when reverse-phase driving signals of the same amount are applied to said first driving unit and said second driving unit, and directions of the resultant forces are perpendicular to each other.

2. The apparatus according to claim 1, wherein said first driving unit and said second driving unit are arranged such that a direction of a larger one of the resultant forces different in magnitude is aligned with a direction in which a larger image blur compensation force is required.

3. The apparatus according to claim 1, further comprising a third driving unit having a magnet and a coil,
    wherein said third driving unit is placed such that a direction of a driving force generated when a driving signal is applied to said third driving unit is aligned with a direction of one of the resultant forces generated when in-phase or reverse driving signals of the same amount are applied to said first driving unit and said second driving unit.

4. The apparatus according to claim 3, wherein a direction of a driving force generated when a driving signal is applied to said third driving unit is aligned with a direction in which a larger image blur compensation force is required.

5. The apparatus according to claim 2, wherein the direction in which the larger image blur compensation force is required is aligned with a direction in which an optical apparatus equipped with the image blur compensation apparatus more largely shakes when the optical apparatus is operated.

6. The apparatus according to claim 3, wherein the direction in which the larger image blur compensation force is required is aligned with a direction in which an optical apparatus equipped with the image blur compensation apparatus more largely shakes when the optical apparatus is operated.

7. The apparatus according to claim 1, further comprising
    a first camera shake detection unit and second camera shake detection unit configured to detect image blur in directions perpendicular to each other,
    a first transform unit configured to transform a first signal output from said first camera shake detection unit into a first driving signal as a driving target value for image blur compensation by applying a first gain to the first signal,
    a second transform unit configured to transform a second signal output from said second camera shake detection unit into a second driving signal as a driving target value for image blur compensation by applying a second gain different from the first gain to the second signal,
    a first driving unit configured to apply the in-phase first driving signals to said first driving unit and said second driving unit, and
    a second driving unit configured to apply the reverse-phase second driving signals to said first driving unit and said second driving unit.

8. The apparatus according to claim 3, further comprising
    a first camera shake detection unit and second camera shake detection unit configured to detect image blur in directions perpendicular to each other,
    a first transform unit configured to transform a first signal output from said first camera shake detection unit into a first driving signal as a driving target value for image blur compensation by applying a first gain to the first signal, a second transform unit configured to transform a second signal output from said second camera shake detection unit into a second driving signal as a driving target value for image blur compensation by applying a second gain different from the first gain to the second signal, a first driving unit configured to apply the reverse-phase first driving signals to the said first driving unit and said second driving unit, a second driving unit configured to apply the in-phase second driving signals to the said first driving unit and said second driving unit, and a third driving unit configured to apply, to said third driving unit, the driving signal from said first transform unit or said second transform unit which transforms an output from one of said first camera shake detection unit and said second camera shake detection unit which detects image blur in a direction in which a larger image blur compensation force is required.

9. An optical apparatus comprising an image blur compensation apparatus according to claim 1.

* * * * *